United States Patent [19]

Nishida et al.

[11] Patent Number: 5,187,198

[45] Date of Patent: Feb. 16, 1993

[54] RESIN COMPOSITION FOR CATIONICALLY ELECTRODEPOSITABLE PAINT CONTAINING AS CROSSLINKING AGENTS THE REACTION PRODUCTS OF HYDROXY FUNCTIONAL ALICYCLIC EPOXY COMPOUNDS AND POLYISOCYANATES

[75] Inventors: Reiziro Nishida; Akira Tominaga, both of Hiratsuka, Japan

[73] Assignee: Kansai Paint Co., Ltd., Hyogo, Japan

[21] Appl. No.: 698,773

[22] Filed: May 13, 1991

[30] Foreign Application Priority Data

May 11, 1990 [JP] Japan .................... 2-120058

[51] Int. Cl.⁵ .................... C08L 63/00; C08G 59/40
[52] U.S. Cl. .................... 523/404; 528/45; 525/526; 523/415; 428/413; 204/181.7
[58] Field of Search .................... 528/45; 204/181.7; 525/526; 428/413; 523/404, 415

[56] References Cited

U.S. PATENT DOCUMENTS

| | | | |
|---|---|---|---|
| 3,947,338 | 3/1976 | Jerabek et al. | 523/415 |
| 4,237,252 | 12/1980 | Newell et al. | 525/454 |
| 4,251,414 | 2/1981 | Nakada et al. | 525/526 |
| 4,596,842 | 6/1986 | Chung et al. | 523/415 |
| 4,990,579 | 2/1991 | Paar | 523/415 |
| 5,043,366 | 8/1991 | Isozaki | 523/412 |

FOREIGN PATENT DOCUMENTS 390624B 6/1990 Austria .

*Primary Examiner*—John C. Bleutge
*Assistant Examiner*—Frederick Krass
*Attorney, Agent, or Firm*—Wenderoth, Lind & Ponack

[57] ABSTRACT

A resin composition for cationically electro-depositable paint comprising (A) a base resin containing a primary hydroxyl group and a cationic group and (B) a crosslinking agent, said crosslinking agent (B) being a product obtained by reacting (B-1) a compound containing in a molecule one hydroxyl group and at least one alicyclic epoxy group with (B-2) a polyisocyanate compound selected from aliphatic, alicyclic and aromatic-aliphatic polyisocyanates such that in principle, a free isocyanate group substantially does not remain.

18 Claims, No Drawings

RESIN COMPOSITION FOR CATIONICALLY ELECTRODEPOSITABLE PAINT CONTAINING AS CROSSLINKING AGENTS THE REACTION PRODUCTS OF HYDROXY FUNCTIONAL ALICYCLIC EPOXY COMPOUNDS AND POLYISOCYANATES

This invention relates to a resin composition for cationically electrodepositable paint excellent in thick coatability, stability and curability as well as in adhesion, weatherability and low-temperature curability of a coated film, said composition being obtained without the use of a blocked polyisocyanate as a curing agent or an organotin compound as a curing catalyst.

Resin compositions for cationically electro-depositable paints composed mainly of polyamine resins such as amine-added epoxy resins and aromatic polyisocyanate compounds blocked with alcohols (curing agent) have been hitherto most widely used and estimated to excell in corrosion resistance of the coated film. These paint resin compositions however suffer serious problems that a temperature at which to start curing is high (above 170° C.); an organotin compound is used as a curing catalyst to lower the temperature at which to start curing; the organotin compound at times poisons an exhaust gas combustion catalyst of a baking furnace; and when heating is conducted at a high temperature to cure a coated film, a blocked isocyanate is heat-decomposed to produce tar and soot, yellowing, bleeding and curing impediment occur on a top coat film, and the top coat film is heavily decreased in weatherability and whitened.

The present inventors discovered a resin composition for cationically electrodepositable paint which is excellent in stability and curability without decrease in corrosion resistance by using a specific polyfunctional polymer as a curing agent, which can remedy the aforesaid various defects due to the use of the organotin compound of the blocked polyisocyanate compound, which is excellent in adhesion because distortion by volume shrinkage does not occur, which is markedly improved in weatherability of a coated film and which is also excellent in low-temperature curability. They already disclosed it in EP-A-356970.

They have further made investigations on said composition and then found in recent years that thick coatability strongly required of cationically electrodepositable paints is not enough. That is, a cationically electrodepositable paint is coated to a film thickness of less than 25 microns. However, coating it to a film thickness of more than 30 microns has been lately much demanded in an attempt to omit an intercoating step and cut down costs. In order to coat the cationically electrodepositable paint to a film thickness of more than 30 microns, it is however necessary that a considerable amount of a base resin having a bisphenol A skeleton with high corrosion resistance, which is generally used in the cationically electrodepositable paint, is replaced with a base resin having an aliphatic skeleton or an amount of a solvent is increased to lower a glass transition temperature (Tg) of the deposited coated film. If this is done, however, problems to decrease corrosion resistance of the coated film and violate BOD and COD regulations of waste water are invited.

In order to remedy these problems, the present inventors have therefore made assiduous investigations on the above composition and as a result, found that its purpose can be achieved by urethanizing the polyfunctional polymer (curing agent). It has led to completion of this invention.

Thus, according to this invention, it is provided a resin composition for cationically electrodepositable paint comprising (A) a base resin containing a primary hydroxyl group and a cationic group and (B) a crosslinking agent, said crosslinking agent (B) being a product obtained by reacting (B-1) a compound containing in a molecule one hydroxyl group and at least one alicyclic epoxy group with (B-2) a polyisocyanate compound selected from aliphatic, alicyclic and aromaticaliphatic polyisocyanates such that in principle, a free isocyanate group substantially does not remain.

The electrodeposition coated film formed by using the resin composition for cationically electrodepositable paint in this invention is crosslink-cured at a temperature of about 250° C. or below. Especially when blending as a catalyst compounds containing metals such as lead, zirconium, cobalt, aluminum, manganese, copper, zinc, iron, chromium and nickel either singly or in combination, crosslink-curing can be conducted even by heating at a low temperature of about 70° C. to about 160° C. This is presumably because the epoxy group contained in the crosslinking agent (B) is ring-opened and reacted with the hydroxyl group (the primary hydroxyl group) of the base resin (A), and the epoxy groups of the crosslinking agent (B) are reacted to form ether linkages respectively.

Accordingly, the resin composition for cationically electrodepositable paint in this invention can achieve the merit that it can be coated thick by using the crosslinking agent (B) without decrease in corrosion resistance, while keeping the merits that it can be cured at a low temperature of 160° C. or below without using the organotin catalyst; because the blocked isocyanate compounds or their derivatives are not used, the aforesaid various defects given by using them can be remedied; good adhesion is exhibited without volume shrinkage owing to heat decomposition; since an urethane bond directly bound to an aromatic ring or an aromatic urea bond is not introduced into crosslinkage, whetherability is little impaired; corrosion resistance and curability of a coated film are excellent; and stability of an electrodeposition bath is good. Since the crosslinking agent (B) in this invention has a polyurethane structure based on a polyisocyanate compound selected from aliphatic, alicyclic and aromatic-aliphatic polyisocyanates (wherein the isocyanate group is not directly bound to the aromatic ring), the resin composition of this invention can be electrodeposited to a film thickness of 30 microns or more without impairing corrosion resistance and weatherability of a coated film.

The resin composition for cationically electrodepositable paint in this invention will be described in more detail.

Base Resin (A)

The base resin (A) used in this invention is one containing a primary hydroxyl group and a cationic group in a molecule. The hydroxyl group serves to conduct a crosslink-curing reaction with an epoxy group of the curing agent (B), and the cationic group is useful to form a stable aqueous solution or water dispersion with the cationic group.

Examples of the base resin (A) are as follows.

(i) a reaction product obtained by reacting a polyepoxy resin with a cationizing agent;

(ii) a product obtained by protonating with an acid a polycondensation product of a polycarboxylic acid and a polyamine (refer to U.S. Pat. No. 2,450,940);

(iii) a product obtained by protonating with an acid a polyaddition compound of a polyisocyanate, a polyol and a mono- or polyamine;

(iv) a product obtained by protonating with an acid a copolymer of an acrylic or vinyl monomer containing a hydroxyl group and an amino group (refer to Japanese Patent Publication Nos. 12395/1970 and 12396/1970); and (v) a product obtained by protonating with an acid an adduct of a polycarboxylic acid resin and an alkyleneimine (refer to U.S. Pat. No. 3,403,088).

Regarding concrete examples of these cationic resins and methods for producing same are described in e.g. Japanese Patent Publication Nos. 12395/1970, 12396/1970 and 23087/1974, and U.S. Pat. Nos. 2,450,940, 3,403,088, 3,891,529 and 3,963,663.

Preferable as the base resin (A) of this invention is the reaction product (i) of the polyepoxy resin and the cationizing agent, above all, a reaction product obtained by, for example, reacting a cationizing agent with an epoxy group of a polyphenol compound-based polyepoxide compound obtained from a polyphenol compound and an epihalohydrin and excellent in corrosion resistance.

The polyepoxide compound is a compound containing at least 2 epoxy groups

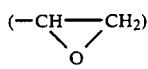

in a molecule, having a number average molecular weight of usually at least 200, preferably 350 to 4,000, more preferably 800 to 2,000 and having an epoxy equivalent of at least 100, preferably 175 to 2,000, more preferably 400 to 1,000. As the polyepoxide compound, compounds known per se are available. For example, a polyglycidyl ether of a polyphenol compound that can be produced by reacting a polyphenol compound with epichlorohydrin in the presence of an alkali is included therein. Examples of the polyphenol compound that can be used here include bis(4-hydroxyphenyl)-2,2-propane, 4,4'-dihydroxybenzophenone, bis(4-hydroxyphanyl)-1,1-ethane, bis-(4-hydroxyphenyl)-1,1-isobutane, bis(4-hydroxy-tert.-butylphenyl)2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenolic novolak, and cresol novolak.

Among the above polyepoxide compounds, a polyglycidyl ether of a polyphenol compound having a number average molecular weight of about 380 to about 10,000, more preferably about 800 to about 2,000 and having an epoxy equivalent of 190 to 2,000, preferably 400 to 1,000 is most suitable to produce the base resin (A). It is represented by the following formula.

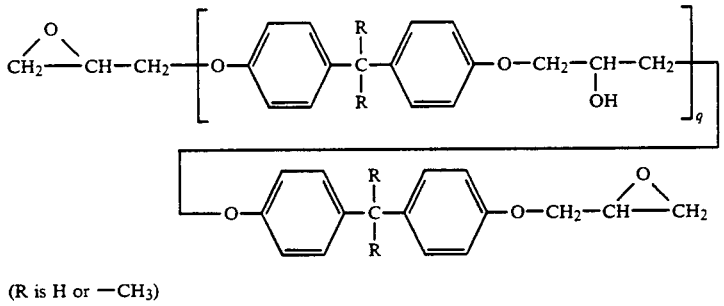

(R is H or —CH₃)

Said polyepoxide compound can be used at times as a base resin (A) by partially reacting it with a polyol, a polyether polyol, a polyester polyol, a polyamideamine, or a polycarboxylic acid, or after graftpolymerizing it with an epsilon-caprolactone or an acrylic monomer.

Meanwhile, examples of the cationizing agent for introducing the cationic group into the polyepoxide compound include aliphatic, alicyclic or aromatic-aliphatic primary or secondary amines, tertiary amine salts, secondary sulfide salts and tertiary phosphine salts. These are reacted with an epoxy group to form a cationic group. It is further possible to introduce a cationic group by reacting a tertiary amino monoisocyanate obtained by the reaction of a tertiary amino alcohol and a diisocyanate with a hydroxyl group of an epoxy resin.

Examples of the amine compound that can preferably be used as the cationizing agent are as follows.

(1) primary amines such as methylamine, ethylamine, n- or iso-propylamine, monoethanolamine and n- or iso-propanolamine;

(2) secondary amines such as diethylamine, diethanolamine, di-n- or iso-propanolamine, N-methylethanolamine and N-ethylethanolamine; and (3) polyamines such as ethylenediamine, diethylenetriamine, hydroxyethylaminoethylamine, ethylaminoethylamine, methylaminopropylamine, dimethylaminoethylamine and dimethylaminopropylamine.

Of these, the alkanolamines having the hydroxyl group and the amino group in a molecule are preferable. It is also possible that the primary amino group is blocked in advance with a ketone and the remaining active hydrogen is then reacted with the epoxy group.

Besides said amine compounds, basic compounds such as ammonia, hydroxylamine, hydrazine, hydroxyethyl hydrazine and a N-hydroxyethylimidazoline compound are also available. Basic groups formed by using these compounds can be protonated into cationic groups with an acid, most preferably a water-soluble organic carboxylic acid such as formic acid, acetic acid, glycolic acid or lactic acid.

Also available are tertiary amines such as triethylamine, triethanolamine, N,N-dimethylethanolamine, N-methyldiethanolamine, N,N-diethylethanolamine and N-ethyldiethanolamine. They can be protonated (or form salts) in advance with an acid and reacted with the epoxy group in the base resin (A) to give quaternary salt groups (cationic groups).

Besides the amino compounds, salts of sulfides such as diethyl sulfide, diphenyl sulfide, tetramethylene sulfide and thiodiethanol with boric acid, carbonic acid and an organic monocarboxylic acid may be reacted with the epoxy group of the base resin (A) to give tertiary sulphonium salt groups (cationic groups).

Moreover, salts of phosphines such as triethylphosphine, phenyldimethylphosphine, diphenylmethylphosphine and triphenylphosphine with the above acids may be reacted with the epoxy group of the base resin (A) to give quaternary phosphonium salt groups (cationic groups).

Examples of the hydroxyl group of the base resin (A) include primary hydroxyl groups that can be introduced from the alkanolamines of the cationizing agent, ring-opened caprolactone that may be introduced into epoxide compounds and primary hydroxyl groupcontaining epoxy compounds. Of these, the primary hydroxyl groups introduced by the alkanolamines are preferable because of excellent crosslink-curing reactivity with the curing agent (B). The alkanolamines exemplified above as the cationizing agent are preferable.

The content of the primary hydroxyl group in the base resin (A) is, from the aspect of crosslinkcuring reactivity with the epoxy group contained in the crosslinking agent (B), usually 20 to 5,000, preferably 100 to 3,000, more preferably 200 to 1,000, calculated as a hydroxyl equivalent. It is advisable that the content of the cationic group is above the lower limit required to stably disperse the base resin (A). It is usually 3 to 200, preferably 5 to 100, most preferably 10 to 80, calculated as KOH (mg/g of the solids) (amine value). However, even if the content of the cationic group is 3 or less, the base resin (A) can be used by making it an aqueous dispersion with a surface active agent. On this occasion, it is advisable that the cationic group is adjusted to pH of usually 4 to 9, preferably 6 to 7.

The base resin (A) used in this invention contains the primary hydroxyl group and the cationic group; it is desirable that in principle said resin does not contain a free epoxy group.

Crosslinking Agent (B)

The crosslinking agent (B) used in this invention is a product obtained by reacting (B-1) a compound containing in a molecule one hydroxyl group and at least one alicyclic epoxy group with (B-2) a polyisocyanate compound selected from aliphatic, alicyclic and aromatic-aliphatic polyisocyanates such that in principle, a free isocyanate group substantially does not remain.

The compound (B-1) is a compound containing one hydroxyl group and at least one alicyclic epoxy group in a molecule. The alicyclic epoxy group can be a group in which an epoxy group (an oxirane group) is, as shown below, directly bound to an alicyclic ring having 5 to 6 carbon atoms (said ring is substantially free from a carbon-carbon double bond) such that two carbon atoms of the epoxy group (the oxirane group) are two adjacent carbon atoms in the alicyclic skeleton. As the compound (B-1), a compound having a number average molecular weight of 100 to 20,000, preferably 150 to 5,000, having a hydroxyl equivalent of usually 100 to 20,000, preferably 150 to 5,000 and an epoxy equivalent of 100 to 1,000, preferably 120 to 600, and melting at about 130° C. or below, preferably −50° to 115° C. can be preferably used. Examples of the compound (B-1) are as follows.

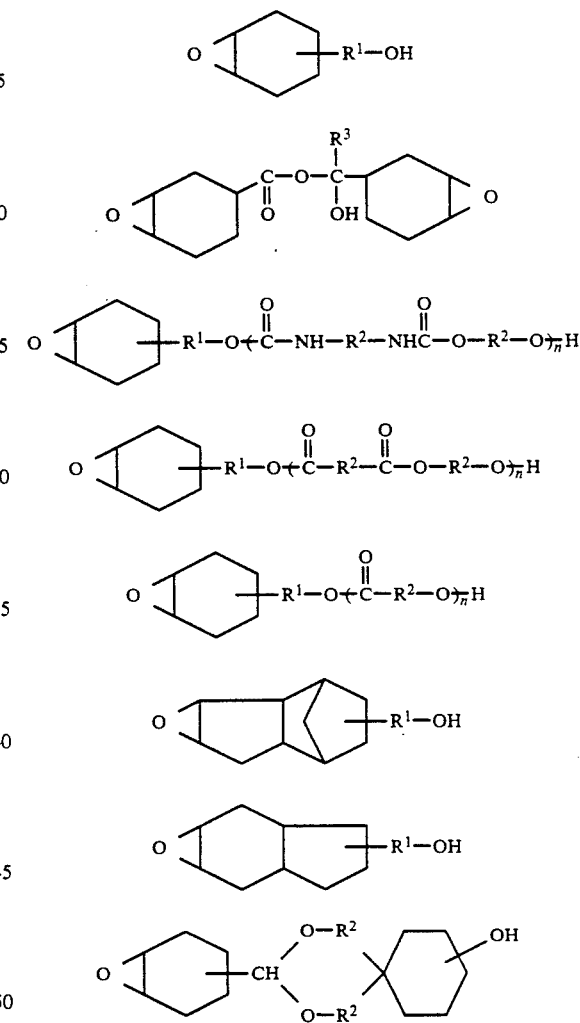

wherein $R^1$ denotes a direct bond or a $C_{1-20}$ divalent hydrocarbon group, $R^2$'s are the same or different and each denotes $C_{1-8}$ divalent hydrocarbon group, $R^3$ denotes H or $CH_3$ and n is an integer of 1 to 10.

Of these, commercially available compounds are shown below.

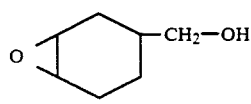   [3,4-epoxytetrahydrobenyl alcohol made by Daicel Chemical Industries, Ltd.]

-continued

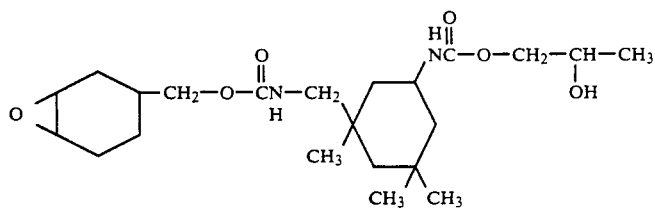

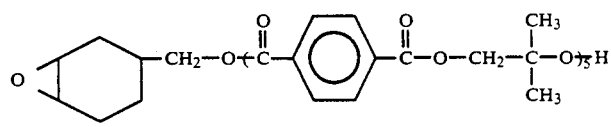

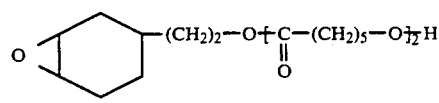

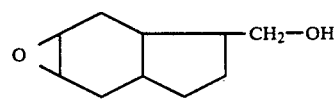

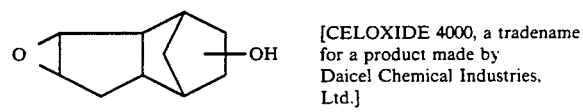

[CELOXIDE 4000, a tradename for a product made by Daicel Chemical Industries, Ltd.]

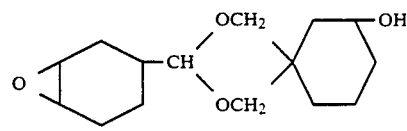

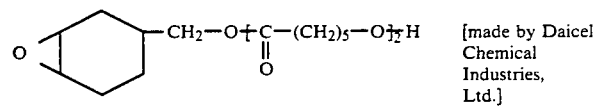

[made by Daicel Chemical Industries, Ltd.]

The polyisocyanate compound (B-2) is an aliphatic, alicyclic or aromatic-aliphatic polyisocyanate compound (a compound containing two or more isocyanate groups in a molecule and in which the isocyanate group is not directly bound to an aromatic ring such as a benzene ring or a naphthalene ring), and can basically be selected from the following compounds.

(a) an aliphatic polyisocyanate compound: a polyisocyanate compound in which two or more isocyanate groups are bound to a linear or branched alkyl group, such as hexamethylene diisocyanate (HMDI), a biuret of HMDI and an isocyanurate of HMDI (b) an alicyclic polyisocyanate compound: a polyisocyanate compound in which two or more isocyanate groups are bound to an alicyclic skeleton either directly or indirectly (via e.g. an alkylene group), such as isophorone diisocyanate (IPDI), a biuret of IPDI, an isocyanurate of IPDI, hydrogenated xylene diisocyanate and hydrogenated 4,4'-diphenylmethane diisocyanate (c) an aromatic-aliphatic polyisocyanate compound: a polyisocyanate compound in which two or more isocyanate groups are indirectly bound to an aromatic ring, such as xylylene diisocyanate and m- (or p-) tetramethylxylylene diisocyanate These may be used either singly or in combination.

Moreover, an aromatic polyisocyanate compound in which an isocyanate group is directly bound to an aromatic ring, such as tolylene diisocyanate or 4,4'-diphenylmethane diisocyanate can be used conjointly with the above compound B-2) unless impeding achievement of the object of this invention.

To be concrete, the urethanization reaction is mainly conducted until a free isocyanate group does not remain such that the content of the hydroxyl group of the compound (B-1) is stoichiometrically nearly the same as the content of the isocyanate group of the compound (B-2). In this reaction, an active hydrogen-free solvent or a reaction catalyst such as a tin compound, a lead compound or a zinc compound can also be used. Typical examples of the thus obtained compound are shown below.

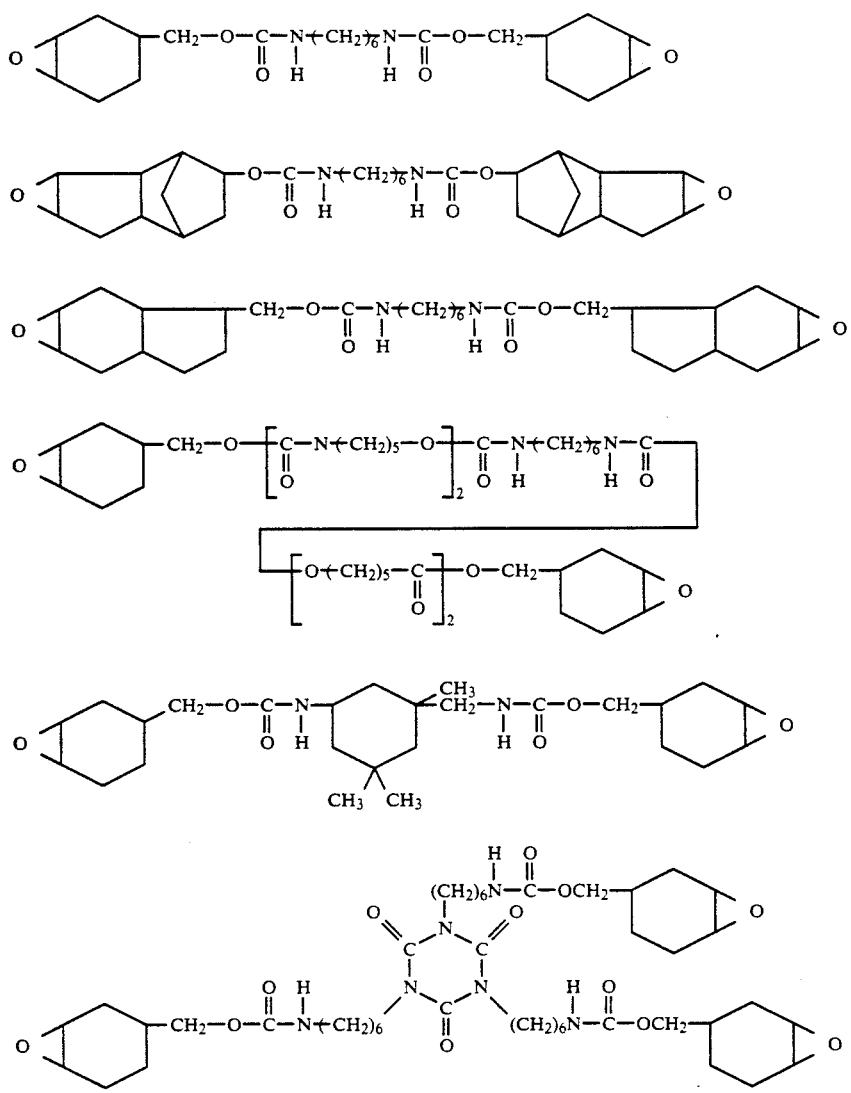
Adduct of 1 mol of IPDI isocyanurate and 3 mols of CELOXIDE 4000:
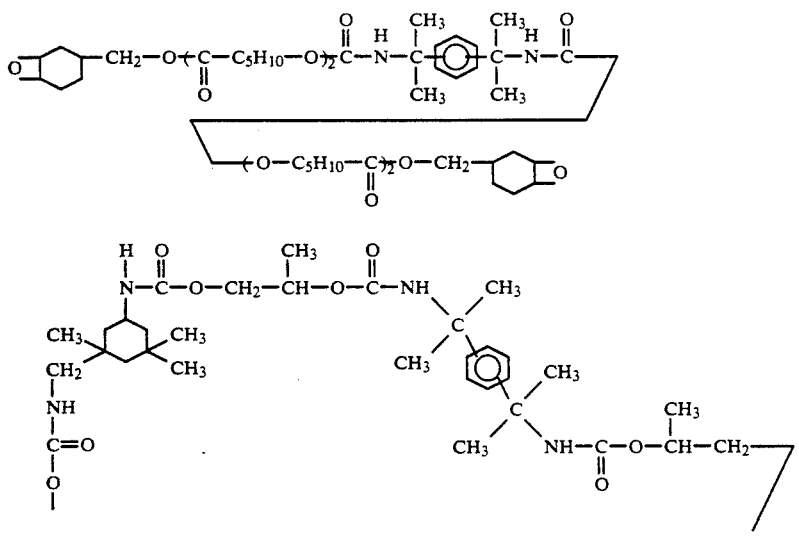

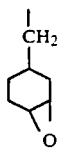
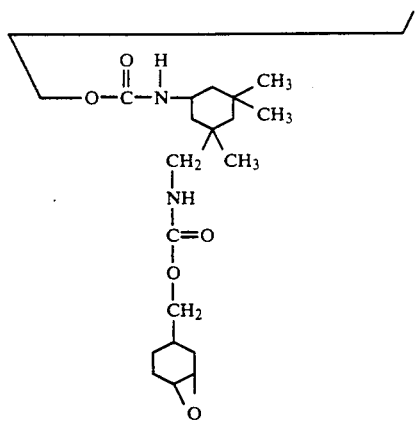
-continued

From the aspect of curability, it is advisable that the thus obtained alicyclic polyepoxide compound [the crosslinking agent (B)] contains at least two, preferable at least three epoxy groups in a molecule. The crosslinking agent (B) has an epoxy equivalent of preferably 100 to 2,000, more preferably 150 to 500, most preferably 150 to 450, and has a number average molecular weight of preferably 100 to 20,000, more preferably 200 to 5,000, most preferably 300 to 2,000.

Resin Composition

The amount of the crosslinking agent (B) can properly be changed depending on the type of the base resin (A) used and within the range of from the minimum amount necessary for heat-curing the coated film to the maximum amount that does not impair stability of the cationically electrodepositable paint. It is usually advisable to select the amount of the crosslinking agent (B) such that the crosslinking agent (B)/base resin (A) weight ratio (as a solids content) is 0.1 to 1.0, preferably 0.2 to 0.85, more preferably 0.2 to 0.65.

The resin composition of this invention may contain a product obtained by previously adding part of the crosslinking agent (B) to the base resin (A).

The composition comprising the base resin (A) and the curing agent (B) in this invention can be used as a resin for cationically electrodepositable paint.

Cationically Electrodepositable Paint

The resin composition of this invention is formed into a cationically electrodepositable paint by, for example, mixing the base resin (A) with the crosslinking agent (B), stably dispersing the mixture in water, and then blending additives, as required. Examples of the additives are color pigments such as carbon black, titanium white, white lead, lead oxide and red oxide; extender pigments such as clay and talc; anticorrosive pigments such as strontium chromate, lead chromate, basic lead chromate, red lead oxide, lead silicate, basic lead silicate, lead phosphate, basic lead phosphate, lead tripolyphosphate, lead silicochromate, chrome yellow, lead cyanamide, calcium plumbate, lead suboxide, lead sulfate, and basic lead sulfate; and other additives. As the other additives, a small amount of a dispersant or a nonionic surface active agent as a cissing preventing agent of the coated surface and a curing promoter may be taken.

Especially, for sufficiently curing the cationically electrodepositable paint using the composition of this invention at a low temperature of 160° C. or below, it is effective to add as a catalyst one or more metal compounds selected from a lead compound, a zirconium compound, a cobalt compound, an aluminum compound, a manganese compound, a copper compound, a zinc compound, an iron compound, a chromium compound, and a nickel compound. Examples of the metal compounds are chelated compounds of said metals, a chelation reaction product of compounds having beta-hydroxyamino structures, carboxylates and hydroxide. Specific examples of these metal compounds include chelated compounds such as zirconium acetyl acetonate, cobalt acetyl acetonate, aluminum acetyl acetonata, and manganese acetyl acetonate; a chelation reaction product of compounds having beta-hydroxyamino structures with lead oxide (II); carboxylates such as lead 2-ethyl hexanoate, lead naphthylate, lead octylate, lead benzoate, lead acetate, lead lactate, lead formate, lead glycolate, lead maleate, and zirconium octylate; and lead hydroxide.

The metal compound can be used such that the content of the metal is not more than 10% by weight, preferably not more than 5% by weight based on the weight of the total solids content of the base resin (A) and the crosslinking agent (B).

The thickness of the coated film obtained by electrodepositing the thus formed cationically electrodepositable paint on a suitable substrate is not strictly limited, but it is usually 3 to 200 microns, especially 10 to 80 microns based on the cured coated film. The coated film can be heat-cured at a temperature of e.g. 70° to 250° C., preferably 120° to 160° C.

Especially when the composition of this invention is coated to a film thickness of more than 30 microns, decrease in corrosion resistance is little observed.

A method for electrodepositing the cationically electrodepositable paint using the resin composition of this invention on a substrate (a product being coated) is not limited in particular, and can be carried out under ordinary cationic electrodeposition conditions. For example, the composition of this invention is, as stated above, dispersed in water, and blended, as required, with a pigment, a curing catalyst and other additives to prepare a cationical electrodeposition bath with a bath concentration (a solids content) of 5 to 40% by weight, preferably 10 to 25% by weight and a bath pH of 5 to 8, preferably 5.5 to 7. Subsequently, using the electrodeposition bath, the electrodeposition can be carried out under the following conditions by using, for example, a carbon plate (5 cm×15 cm×1 cm) as an anode and a zinc phosphate-treated plate (5 cm×15 cm×0.7 mm) as a cathode.

Bath temperature: 20° to 35° C., preferably 25° to 30° C.

Direct current;

Current density: 0.005 to 2 A/cm², preferably 0.01 to 1 A/cm².

Voltage: 10 to 500 V, preferably 100 to 300 V.

Current passage time: 0.5 to 5 minutes, preferably 2 to 3 minutes.

After the electrodeposition, the coated object is drawn up from the electrodeposition bath, and rinsed with water. The moisture content in the electrodeposition coated film can be removed by drying means such as hot air, etc.

Thus, the electrodeposition coated film formed by using the resin composition for cationically electrodepositable paint in this invention can be heat-cured as mentioned above.

The following examples will illustrate this invention more specifically. Parts and percentages in said examples are all by weight.

I. Production Examples (1) Basic Resin (A-1)

A bisphenol A type epoxy resin having an epoxy equivalent of 950 ["Epikote 1004": a tradename for a product of Shell Chemicals Co., Ltd.] (1,900 parts) was dissolved in 993 parts of butyl cellosolve. To the solution, 210 parts of diethanolamine was added dropwise at 80° to 100° C., and the mixture was then maintained at 100° C. for 2 hours to obtain a base resin (A-1) having a solids content of 68%, a primary hydroxyl equivalent of 528 and an amine value of 53.

(2) Base Resin (A-2)

Monoethanolamine (39 parts) was kept in a reaction vessel at 60° C., and 100 parts of N,N-dimethylaminopropylacrylamide was added dropwise, followed by the reaction at 60° C. for 5 hours. There was obtained a monoethanolamine adduct of N,N-dimethylaminopropylacrylamide.

Separately, a reaction vessel was charged with 950 parts of bisphenol A diglycidyl ether having an epoxy equivalent of 190, 340 parts of propylene glycol diglycidyl ether having an epoxy equivalent of 340, 456 parts of bisphenol A and 21 parts of diethanolamine. The temperature was elevated to 120° C., and the reaction was conducted until an epoxy value reached 1.02 mmols/g. The reaction mixture was then diluted with 479 parts of ethylene glycol monobutyl ether and cooled. Thereafter, while keeping the temperature at 100° C., 158 parts of diethanol amine and 43 parts of the above monoethanolamine adduct of N,N-dimethylaminopropylacrylamide were added, and the reaction was run until increase in viscosity stopped. There resulted a base resin (A-2) having a solids content of 80%, a primary hydroxyl equivalent of 547 and an amine value of 54.

(3) Base Resin (A-3)

Propylene glycol diglycidyl ether (2,040 parts) having an epoxy equivalent of 340, 456 parts of bisphenol A and 21 parts of diethanolamine were charged into a reaction vessel, and heated to 120° C. After the reaction was conducted until an epoxy value reached 0.80 mmol/g, the reaction mixture was diluted with 680 parts of ethylene glycol monobutyl ether and cooled. Subsequently, while keeping the temperature at 100° C., 158 parts of diethanolamine and 43 parts of the monoethanolamine adduct of N,N-dimethylaminopropylacrylamide used in the base resin (A-2) were added. The reaction was performed until increase in viscosity stopped to obtain a base resin (A-3) having a resin solids content of 80%, a primary hydroxyl equivalant of 755, and an amine value of 42. Compared with the base resin (A-2), said resin (A-3) contains a very small amount of a component having a bisphenol A-type skeleton and instead a very large amount of a component having a propylene glycol skeleton.

(4) Crosslinking Agent (B-1)

DURANATE YPA-110 [a tradename for isocyanurate of hexamethylene diisocyanate made by Asahi Chemical Industry Co., Ltd., an isocyanate equivalent 185] (14.5 parts) and 10.5 parts of 3,4-epoxytetrahydrobenzylalcohol [a product of Daicel Chemical Industries, Ltd., an epoxy equivalent 135] were reacted at 120° C. for 3 hours. After the isocyanate value was confirmed to be 0, 6.3 parts of methyl propanol was added to obtain a crosslinking agent (B-1) having a solids content of 80%, a number average molecular weight of 970 and an epoxy equivalent of 325.

(5) Crosslinking Agent (B-2)

IPDI-T1890100 [a tradename for isocyanurate of isophorone diisocyanate made by Daicel Hüls Industries, Ltd., an isocyanate equivalent 247] (17.5 parts) and 12.5 parts of CELOXIDE 4000 [a tradename for a product of Daicel Chemical Industries, Ltd., an epoxy equivalent 177] were reacted at 120° C. for 3 hours. After the isocyanate value was confirmed to be 0, 7.5 parts of methyl isobutyl ketone was added to obtain a crosslinking agent (B-2) having a solids content of 80%, a number average molecular weight of 1,270 and an epoxy equivalent of 425.

(6) Crosslinking Agent (B-3)

EHPE-3150 [a tradename for polyepoxide of Daicel Chemical Industries, Ltd. having a structure that a vinyl group of a vinyl cyclohexane ring is epoxidized; an epoxy equivalent 190 and a number average molecular weight 1,500] (8 parts) was dissolved in 2 parts of methyl propanol to a solids content of 80%.

(7) Crosslinking Agent (B-4)

TMXDI [a tradename for tetramethylxylene diisocyanate made by American Cyanamid Company, an isocyanate equivalent 122] (244 parts) and 716 parts of a product represented by formula

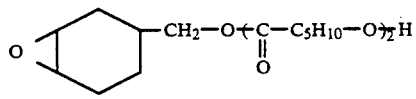

(made by Daicel Chemical Industries, Ltd., an epoxy equivalent 358) were reacted at 120° C. for 3 hours. After the isocyanate value was confirmed to be 0, 240 parts of methyl propanol was added to obtain a crosslinking agent having a solids content of 80%, a number average molecular weight of 960 and an epoxy equivalent of 465.

(8) Crosslinking Agent (B-5)

3,4-Epoxytetrahydrobenzyl alcohol (203 parts) and 333 parts of isophorone diisocyanate were reacted at 100° C. for 2 hours. When the isocyanate value reached 117, 114 parts of propylene glycol was added, and the reaction was run at 120° C. for 3 hours to confirm that the isocyanate value was 0. The resulting product had an epoxy equivalent of 430. After 60 parts of methyl isobutyl ketone was added, TMXDI [a tradename for tetramethylxylene diisocyanate of American Cyanamid Company, an isocyanate equivalent 122] (183 parts) was added, and the mixture was maintained at 120° C. for 3 hours. After the isocyanate value was confirmed to be 0, 148 parts of methyl propanol was added to obtain a crosslinking agent (B-5) having a solids content of 80%, a number average molecular weight of 720 and an epoxy equivalent of 350.

(9) Pigment Paste (P-1)

To 12.5 parts of the base resin (A-2) was added 4.4 parts of 10% formic acid. With stirring, 15 parts of deionized water was added. Further, 10 parts of titanium white, 10 parts of clay, 1 part of carbon and 2 parts of basic lead silicate were added, and dispersed with a ball mill for 24 hours, followed by adding 11 parts of deionized water. There was obtained a paste having a solids content of 50%.

II. EXAMPLES AND COMPARATIVE EXAMPLES

Using the base resins, the crosslinking agents and the pigment paste obtained in said Production Examples, aqueous emulsions were prepared and resin compositions for cationically electrodepositable paints intended by this invention were obtained. The formulations and amounts of components in these compositions are shown in Table 1.

under open conditions to give a test bath. Said test bath was electrodeposited on a zinc phosphate-treated plate at a bath temperature of 30° C. and 250 V, and baked at 160° C. for 30 minutes to obtain a cured coated film. The test results are shown in Table 1. The thickness of the film (cured coated film) was adjusted by a current passage time. In Comparative Example 1, coating to a film thickness of 40 microns was impossible, so that a test with 40 microns was omitted.

The methods for measuring the properties are as follows.

a) Corrosion resistance:

Corrosion resistance is tested in accordance with JIS Z2371. When a blister of a coated film within 2 mm on one side of a creek width from a cut (a linear cut) of the coated film and outside the cut is less than 8 F (ASTM), it is made acceptable. A test time in the salt spray is 2,000 hours.

b) Impact resistance (du-Pont system):

After a test plate was put in a constant-temperature, constant-humidity chamber (temperature 20°±1° C., humidity 75°±2%), a receiving base of a prescribed size and a point of impact are installed in a du-Pont impact tester. The test plate is mounted therebetween with the coated surface of the test plate up. Then, a prescribed weight is dropped on the point of impact from a prescribed height. When break and peeling due to impact of the coated film are not observed, it is made acceptable.

c) Weight loss on heating:

The weight of the treated plate is made $W_0$. After the sample is electrodeposited on the treated plate at 30° C. for 3 minutes, the plate is dried under reduced pressure in a vacuum dryer at 80° C. for 1 hour. The weight of the dried plate is made $W_1$, and the weight after baking in the dryer at 180° C. for 30 minutes is made $W_2$. The weight loss on heating $\Delta W$ is calculated by the following equation.

TABLE 1

|  |  | Example | | | | | Comparative Example | |
|---|---|---|---|---|---|---|---|---|
|  |  | 1 | 2 | 3 | 4 | 5 | 1 | 2 |
| Base resin | No. | (A-1) | (A-2) | (A-2) | (A-2) | (A-2) | (A-2) | (A-3) |
|  | Amount (parts) | 110 | 94 | 81 | 81 | 94 | 94 | 94 |
| Crosslinking agent | No. | (B-1) | (B-1) | (B-2) | (B-4) | (B-5) | (B-3) | (B-3) |
|  | Amount (parts) | 31 | 31 | 44 | 44 | 31 | 31 | 31 |
| 10% formic acid aqueous solution |  | 29 | 15 | 15 | 15 | 15 | 15 | 29 |
| Lead octylate |  | 2.6 | 2.6 | 2.6 | 2.6 | 2.6 | 2.6 | 2.6 |
| Deionized water |  | 327 | 357 | 357 | 357 | 357 | 357 | 327 |
| Pigment paste/water |  | (P-1) | (P-1) | (P-1) | (P-1) | (P-1) | (P-1) | (P-1) |
| pH |  | 5.5 | 6.3 | 6.3 | 6.3 | 6.3 | 6.3 | 6.3 |
| Corrosion[a] resistance | Film thickness 20μ | ◯ | ◯ | ◯ | ◯ | ◯ | ◯ | X |
|  | 40μ | ◯ | ◯ | ◯ | ◯ | ◯ | — | X |
| Impact[b] resistance | Film thickness 20μ | ◯ | ◯ | ◯ | ◯ | ◯ | ◯ | ◯ |
|  | 40μ | ◯ | ◯ | ◯ | ◯ | ◯ | — | ◯ |
| Weight loss on heating[c] (%) |  | 4.0 | 3.9 | 3.7 | 3.8 | 4.1 | 3.8 | 3.7 |

III. Test Results of Properties

Each (450 parts) of the compositions (dispersions each having a solids content of 20%) obtained in Examples and Comparative Examples was mixed with 66 parts of the pigment paste and 99 parts of deionized water to prepare a 20% electrodeposition bath. The electrodeposition bath was stirred at 30° C. for 50 hours $$\Delta W = \frac{W_2 - W_0}{W_1 - W_0} \times 100 \, (\%)$$

What we claim is:

1. A resin composition for a cationically electrodepositable paint comprising:

(A) a base resin containing a primary hydroxyl group and a cationic group obtained by reacting a polyepoxy resin and an alkanolamine, and (B) a crosslinking agent, said crosslinking agent (B) being a product obtained by reacting (B-1) a compound containing in its molecule one hydroxyl group and at least one alicyclic epoxy group with (B-2) a polyisocyanate compound selected from aliphatic, alicyclic or aromatic-aliphatic polyisocyanates such that in principle, a free isocyanate group substantially does not remain, said electrodepositable paint forming a coating upon application of an electrical current.

2. The resin composition of claim 1 wherein the base resin (A) is a reaction product obtained by reacting an epoxy group of a polyepoxide compound based on a polyphenol compound with a cationizing agent.

3. The resin composition of claim 2 wherein the polyepoxide compound has a number average molecular weight of 350 to 4,000.

4. The resin composition of claim 2 wherein the polyepoxide compound has an epoxy equivalent of 175 to 2,000.

5. The resin composition of claim 2 wherein the polyepoxide compound is represented by formula

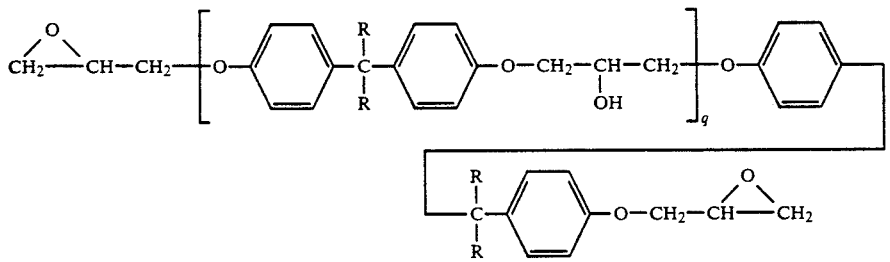

wherein q=0 to 7 and R is H or CH$_3$.

6. The resin composition of claim 1 wherein the base resin (A) contains 20 to 5,000 hydroxyl groups calculated as a primary hydroxyl equivalent.

7. The resin composition of claim 1 wherein the base resin (A) contains 3 to 200 cationic groups calculated as KOH (mg/g of a solids content).

8. The resin composition of claim 1 wherein the compound (B-1) has a number average molecular weight of 100 to 20,000, a hydroxyl equivalent of 100 to 20,000, an epoxy equivalent of 100 to 1,000 and a melting point of about 130° C. or below.

9. The resin composition of claim 1 wherein the compound (B-1) is selected from the group consisting of

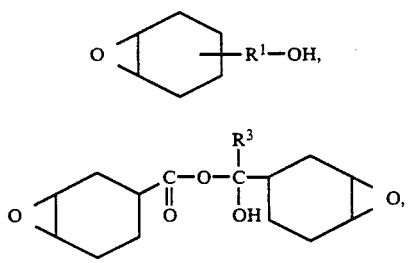

-continued

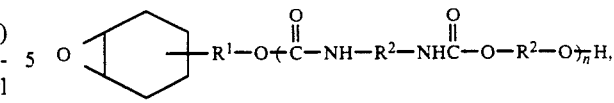

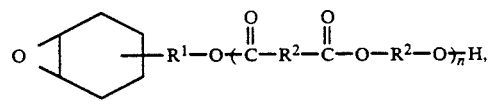

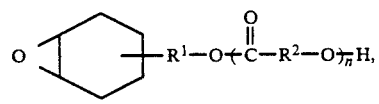

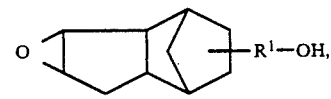

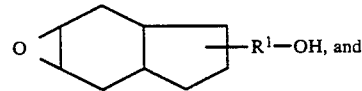

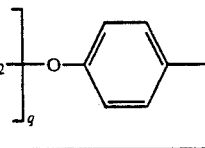

wherein R$^1$ denotes a direct bond or a C$_{1-20}$ divalent hydrocarbon group, R$^2$'s are the same or different and each denotes a C$_{1-8}$ divalent hydrocarbon group, R$^3$ denotes H or CH$_3$, and n is an integer of 1 to 10.

10. The resin composition of claim 1 wherein the polyisocyanate compound (B-2) is selected from the group consisting of hexamethylene diisocyanate, its biuret or isocyanurate, isophorone diisocyanate, its biuret or isocyanurate, hydrogenated xylene diisocyanate, hydrogenated 4,4'-diphenylmethane diisocyanate, xylene diisocyanate, and m- (or p-)tetramethylxylene diisocyanate.

11. The resin composition of claim 1 wherein the crosslinking agent (B) is selected from the group consisting of

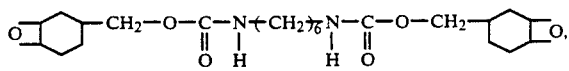

-continued
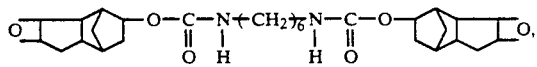
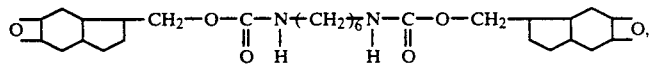
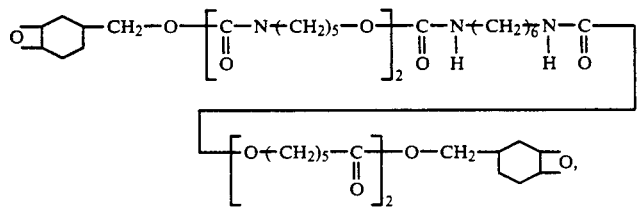
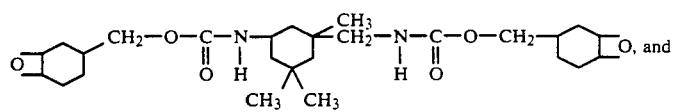
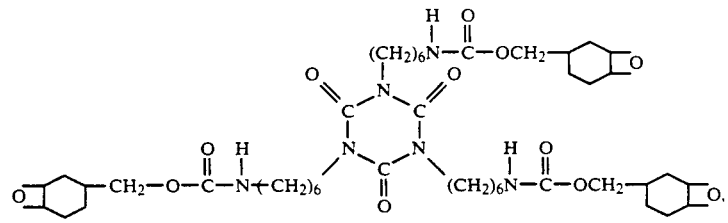
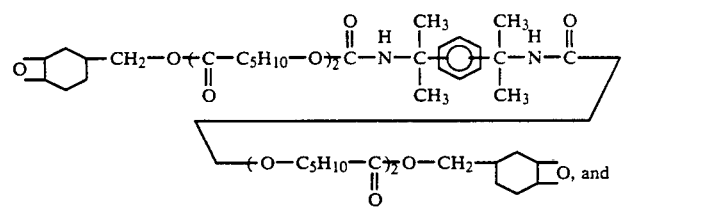
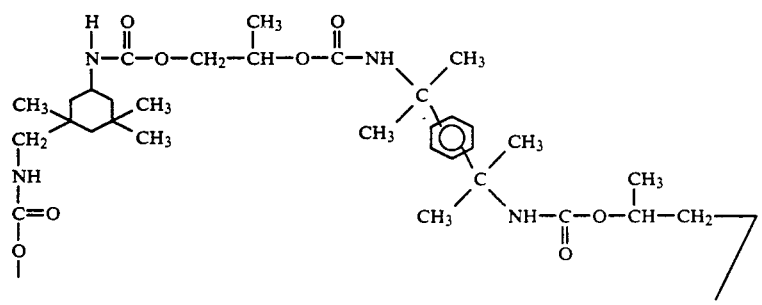

-continued

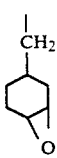 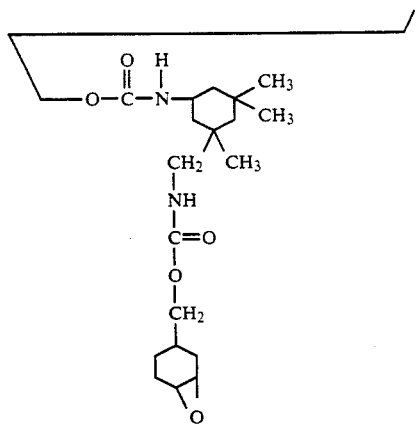

12. The resin composition of claim 1 wherein the crosslinking agent (B) has an epoxy equivalent of 100 to 2,000.

13. The resin composition of claim 1 wherein the crosslinking agent (B) has a number average molecular weight of 100 to 20,000.

14. The resin composition of claim 1 wherein the crosslinking agent (B)/base resin (A) weight ratio (as a solids content) is 0.1 to 1.0.

15. The resin composition of claim 1 wherein the crosslinking agent (B)/base resin (A) weight ratio (as a solids content) is 0.2 to 0.85.

16. A cationically electrodepositable paint comprising an aqueous dispersion of the resin composition of claim 1.

17. The paint of claim 16 further comprising as a catalyst a metal compound selected from the group consisting of a lead compound, a zirconium compound, a cobalt compound, an aluminum compound, a manganese compound, a copper compound, a zinc compound, a chromium compound and a nickel compound.

18. An article coated with the cationically electrodepositable paint of claim 16.

* * * * *